United States Patent
Zhao et al.

(10) Patent No.: US 8,661,821 B2
(45) Date of Patent: Mar. 4, 2014

(54) PROCESS FOR REDUCING COAL CONSUMPTION IN COAL FIRED POWER PLANT WITH FLUIDIZED-BED DRYING

(75) Inventors: Xu Zhao, Gansu (CN); Maikui Zhang, Gansu (CN); Yan Dou, Gansu (CN); Yongzhong Jiang, Gansu (CN); Jinwen Shi, Gansu (CN)

(73) Assignees: Tianhua Institute of Chemical Machinery and Automation, Xigu, Lanzhou, Gansu (CN); National Engineering Technology Research Center of Drying Technology & Equipment, Xigu, Lanzhou, Gansu (CN); Lanzhou Ruide Drying Technology Co., Ltd., Xigu, Lanzhou, Gansu (CN)

( * ) Notice: Subject to any disclaimer, the term of this patent is extended or adjusted under 35 U.S.C. 154(b) by 531 days.

(21) Appl. No.: 13/040,016

(22) Filed: Mar. 3, 2011

(65) Prior Publication Data

US 2011/0220744 A1    Sep. 15, 2011

(30) Foreign Application Priority Data

Mar. 9, 2010   (CN) .......................... 2010 1 0123252

(51) Int. Cl.
*F01K 7/34* (2006.01)
*B09B 3/00* (2006.01)

(52) U.S. Cl.
USPC .................. 60/653; 60/662; 60/663; 60/664; 60/678; 60/679; 122/4 R; 122/483

(58) Field of Classification Search
USPC .................. 60/653, 660, 661, 662, 663, 664, 60/677–680; 122/4 R, 4 D, 483
See application file for complete search history.

(56) References Cited

U.S. PATENT DOCUMENTS

| | | | | |
|---|---|---|---|---|
| 4,823,712 A | * | 4/1989 | Wormer | 110/245 |
| 5,273,000 A | * | 12/1993 | Regan | 122/4 D |
| 5,477,683 A | * | 12/1995 | Persson | 60/653 |
| 5,509,264 A | * | 4/1996 | Ito et al. | 60/39.12 |
| 5,570,578 A | * | 11/1996 | Saujet et al. | 60/647 |
| 5,937,652 A | * | 8/1999 | Abdelmalek | 60/648 |
| 7,540,384 B2 | * | 6/2009 | Ness et al. | 209/134 |

* cited by examiner

*Primary Examiner* — Hoang Nguyen

(74) *Attorney, Agent, or Firm* — Greer, Burns & Crain, Ltd.

(57) ABSTRACT

The present invention relates to a process for reducing coal consumption in coal fired plant with fluidized-bed drying, namely a fluidized-bed drying system is provided between a coal powder bunker as well as a weighing belt and a coal grinding mill of the prior coal fired boiler generating set, and superheated steam which has done partial work is extracted from an steam turbine and used as a drying medium, moisture contained in the coal powder is evaporated with sensible heat and latent heat of the superheated steam, water resulted from the condensation of the superheated steam is fed into a deaerator of the steam turbine via a condensate pump for recirculation. The present invention has advantages of reducing coal consumption and saving coal, recovering residual heat, reducing emission of carbon dioxide and adopting to the national industrial policy on energy saving and emission reduction.

6 Claims, 1 Drawing Sheet

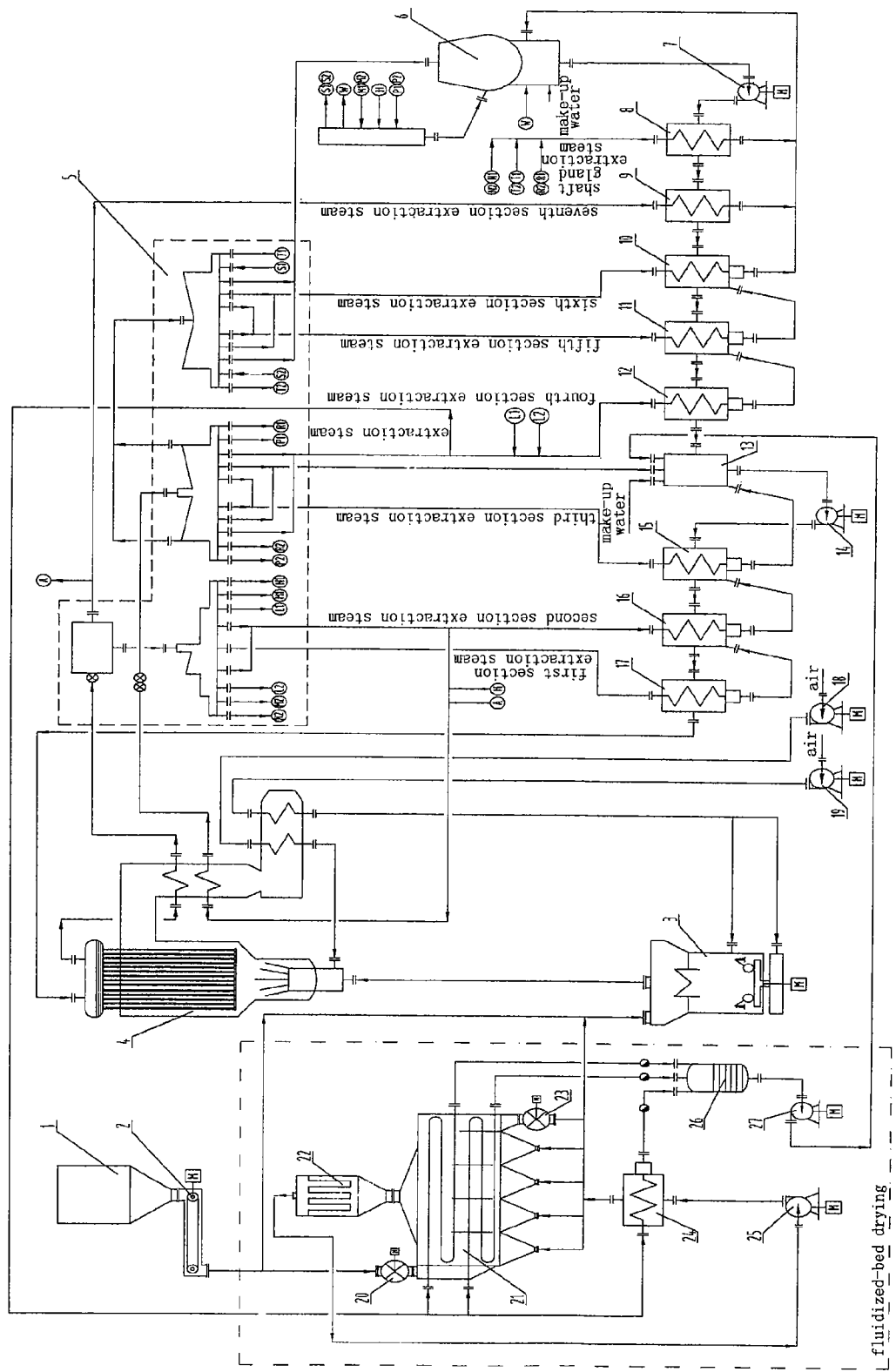

PROCESS FOR REDUCING COAL CONSUMPTION IN COAL FIRED POWER PLANT WITH FLUIDIZED-BED DRYING

FIELD OF THE INVENTION

The present invention relates to a technical field of coal-saving and consumption reduction in coal fired generator sets in power plant, and more particularly to a process for reducing coal consumption in coal fired power plant with fluidized-bed drying.

BACKGROUND OF THE INVENTION

Coal fired steam generating set is a steam power cycle system based on Rankine cycle and comprises a condensate-type generating set and a coal fired boiler generating set, the operational procedure of the coal fired steam generating set is as follows: raw coal is dried and crushed into coal powder via a coal grinding mill, the coal powder is fed into a boiler and combusted so as to release heat, water absorbs heat at a certain pressure in a steam drum of the boiler and evaporated into saturated steam. The saturated steam absorbs heat in a superheater and is changed into superheated steam, the superheated steam expands and does work to outside via a steam turbine, and a certain heat loss occurs. After the superheated steam has done work due to expansion in the steam turbine, exhaust steam at an outlet at a tail end of the steam turbine is fed into a condenser so as to perform cold-source heat dissipation and condense into water. The water is sequentially fed into a shaft gland heater and a multi-stage low pressure heater (i.e., a first low pressure heater, a second low pressure heater, a third low pressure heater and a fourth low pressure heater) and heated stage by stage; the heated water is fed into a deaerator for oxygen removal, enhanced in pressure via a water feed pump, fed into a multi-stage high pressure heater (i.e. a fifth high pressure heater, a sixth high pressure heater, a seventh high pressure heater, and a eighth high pressure heater) and reheated; the reheated water is fed into a coal economizer so as to be further heated in the boiler system, and then fed into the steam drum for steam-liquid separation; the saturated steam is discharged from the steam drum and fed into the superheater of the boiler, heated by the superheater of the boiler into superheated steam with a certain temperature, the superheated steam is fed into the steam turbine for generating electricity.

The above procedure has the following disadvantages.

A. The coal powder which is fed into a coal pulverizing system (such as a coal grinding mill, a coal grinding air blower, and so on) and a boiler contains moisture, the moisture will be evaporated in the coal pulverizing system and a furnace of the boiler, the required heat for evaporation of the moisture is supplied by a combustion heat result from the combustion of the coal powder self in the boiler, therefore it is necessary to consume a large quantity of the coal powder so as to evaporate the moisture contained in the coal powder.

B. During generating electricity by the superheated steam in the steam turbine, conversion rate from heat energy of the superheated steam to the electric energy is less than 50%, the reason for low generating efficiency lies in: with a process of heating a condensing water by extraction steam from the steam turbine, about one third of evaporation latent heat of the superheated steam is used, about two third of evaporation latent heat of the superheated steam can not be used and only is carried away by a condensing medium via the condenser so as to be dissipated via a water cooling tower or an air cooling island, so the latter part is a maximum heat consumption which can not be used, namely cold-source loss of the condensing-type generating set.

SUMMARY OF THE INVENTION

In view of the above description, an object of the present invention is to provide a process for reducing coal consumption in coal fired power plant with fluidized-bed drying, namely a fluidized-bed drying system is provided between a coal grinding mill and a coal powder bunker as well as a weighing belt of the existing coal fired boiler generating set, and superheated steam which have done partial work is extracted from an steam turbine and used as a drying medium; moisture contained in the coal powder is evaporated with sensible heat and latent heat of the superheated steam, water resulted from the condensation of the superheated steam is fed into a deaerator of the steam turbine via a condensate pump for recirculation.

In order to achieve the object of the present invention, the present invention provides a process for reducing coal consumption in coal fired power plant with fluidized-bed drying, comprising steps of: providing a fluidized-bed drying system between a coal grinding mill and a coal powder bunker as well as a weighing belt; weighing raw coal from the coal powder bunker by the weighing belt and feeding the weighed raw coal into the fluidized-bed drying system which comprises an air lock, a fluidized-bed dryer, a dust collector, a heat exchanger, a recirculating blower, a condensate pot and a condensate pump; feeding superheated steam extracted from forth section or fifth section of a steam turbine into the fluidized-bed direr to dry coal powder. Feeding water vapor and noncondensable gas evaporated from the coal powder into the dust collector for removal of dust, enhancing tail gas after removal of dust in pressure via the recirculating blower and then feeding the tail gas into the heat exchanger, feeding the heated tail gas as a fluidized-wind and a drying wind into the fluidized-bed dryer for recycling. Feeding the dried coal powder into the coal grinding mill; condensing superheated steam into water and feeding the condensed water into the condensate pot, enhancing the condensed water in pressure via the condensate pump, and feeding the pressurized water into a deaerator; and then mixing the pressured water with condensed water which has been heated by a multi-stage low pressure heater so as to be a mixture, performing removal of oxygen on the mixture so as to be a boiler feed water; feeding the boiler feed water into a multi-stage high pressure heater (i.e. a fifth high pressure heater, a sixth high pressure heater, a seventh high pressure heater) in turn for reheating by heating medium respectively from extraction steams of a third section, a second section, and a first section of the steam turbine, feeding the reheated boiler feed water into a coal economizer and further heating the same in the boiler system, and feeding the further heated boiler feed water into the steam drum for steam-liquid separation so as to be saturated steam, discharging the saturated steam from the steam drum and feeding the saturated steam into a superheater of the boiler to heat the saturated steam into superheated steam, and feeding the superheated steam into the steam turbine for generating electricity so as to perform Rankine cycle.

Drying medium used in the fluidized-bed drying system is extraction steam from the steam turbine, the extraction steam is from the first section, the second section, the third section, the fourth section, the fifth section, the sixth section or the seventh section of the steam turbine, and the extraction steam has a pressure of 0.6-0.8 MPa.

The fluidized-bed dryer in the fluidized-bed drying system may be a horizontal mono-compartment fluidized-bed dryer, a horizontal multi-compartment fluidized-bed dryer, a vertical mono-layer fluidized-bed dryer, or a vertical multi-layer fluidized-bed dryer.

The dust collector in the fluidized-bed drying system may be a dry dust collector or a wet dust collector. The dry dust collector may be a cyclone separator, a bag dust collector or an electrostatic precipitator. The wet dust collector may be a Venturi wet dust collector, a swashing wet dust collector, or a wet washing tower.

The fluidized-bed drying system may be used for a coal powder boiler system which requires a coal pulverizing system or a circulating fluidized-bed boiler system without pulverizing.

fluidized-bed drier, which is from the extraction steam of the steam turbine, is the same as a cold-source heat dissipation loss of the exhaust steam discharged from the steam turbine during the condensation process in the condenser. How much heat of the extraction steam from the steam turbine is consumed by the drying process, the cold-source will reduce the same amount of the heat dissipation loss. Therefore, the fluidized-bed drying system provided ahead of the coal pulverizing system or the boiler will reduce the amount of coal consumption in the generating set and a rate of self-used power. Hereinafter, it will be described by way of example.

Lignite containing total moisture of 33% is dried respectively to one containing total moisture of 8% and one containing total moisture of 15%, whose parameters of coal quality are respectively as follows.

| No. | Items | Symbol | Unit | Wet coal | Dried coal 1 | Dried coal 2 |
|---|---|---|---|---|---|---|
| 1 | Total moisture | Mt | % | 33.40 | 8.00 | 15.00 |
| 2 | moisture (air dying basis) | Mad | % | 13.04 | 8.00 | 13.04 |
|   | Free-moisture | Mf | % | 23.41 | 0.00 | 2.25 |
| 3 | Correction coefficient | — | — | 1.00 | 1.38 | 1.28 |
| 4 | Ash content (as received basis) | Aar | % | 8.66 | 11.96 | 11.05 |
| 6 | Volatile Matter (dry ash-free basis) | Vdaf | % | 44.65 | 44.65 | 44.65 |
| 7 | Carbon (as received basis) | Car | % | 42.97 | 59.36 | 54.84 |
| 8 | Hydrogen (as received basis) | Har | % | 2.86 | 3.95 | 3.65 |
| 9 | Oxygen (as received basis) | Oar | % | 11.35 | 15.68 | 14.49 |
| 10 | Nitrogen (as received basis) | Nar | % | 0.61 | 0.84 | 0.78 |
| 11 | Total sulphur | St, ar | % | 0.15 | 0.21 | 0.19 |
| 12 | High caloric value (as received basis) | Qgr, ar | MJ/kg | 16.51 | 22.98 | 21.23 |
| 13 | Low caloric value (as received basis) | Qnet, ar | MJ/kg | 15.15 | 21.89 | 20.03 |
|   |   |   | kcal/kg | 3623 | 5227.19 | 4783.85 |
| 14 | Hardgrove grindability index | HGI | — | 67 | 67 | 67 |

In comparison with the prior art, energy-saving effect is set forth as follows.

Whether the moisture in coal fired required by the coal fired boiler generating set is evaporated in a furnace of the boiler in the prior art or in the fluidized-bed dryer of the present invention, it can be regarded as a dehydrating and drying process of the coal fired. Although the required heat for evaporation of the moisture is supplied by a combustion heat result from the combustion of the coal in the boiler, there are the following differences in supplying the required heat.

(1) In the prior art, the required heat for evaporation of the moisture contained in the coal powder in the coal pulverizing system and the furnace of the boiler is directly supplied by a combustion heat resulted from the combustion of the coal powder. As long as the coal powder contains moisture, some of the combustion heat will be used to evaporate the moisture, more moisture is contained in the coal powder, more coal powder will be consumed, and vice versa.

(2) In the present invention, the required heat for evaporation of the moisture contained in the coal powder in the fluidized-bed dry system is supplied by the extraction steam which has done partial work in the steam turbine in manner of indirectly heat exchange. A process of extracting the superheated steam from the steam turbine for drying the coal powder in the fluidized-bed dryer is similar to a process of condensing the superheated steam into water in the condenser. One part of the heat consumed in drying the coal powder in the fluidized-bed dryer is sensible heat; other part is steam latent heat. During the superheated steam is condensed into water in the fluidized-bed dryer, most of heat released is steam latent heat and it is also a cold-source dissipated by the condenser. It has been found that the heat for drying in the With respect to a general generating set having a generation power of 634.34 MW, under a condition that the coal fired is not performed on drying and the extraction steam is not extracted, amount of coal consumption for the general generating set as designed is 354 t/h (total moisture is 33.4%, wet basis).

If the coal fired will be dried to total moisture of 8%, when the extraction steam by extracting from the fifth section at 120 t/h (the parameter of extraction steam is that the superheated steam has 0.57 MPa (A) and 280.3° C.) is used to dry the coal fired and the total moisture of the coal fired is dried to 8%, the actual amount of coal consumption of the generating set is 248 t/h (8.0%, wet basis), which is converted into an amount of coal consumption of 342.57 t/h (total moisture is 33.4%, wet basis) before drying. In comparison with the general generating set, the amount of coal saved through drying the coal fired into total moisture of 8% by the drying and extraction steam generating set is as follows:

354−342.57=11.4301, which is converted into a standard coal of 9.46 g/kWh.

If the coal fired will be dried to total moisture of 15%, when the extraction steam by extracting from the fifth section at 100 t/h (the parameter of extraction steam is that the superheated steam has 0.57 MPa (A) and 280.3° C.) is used to dry the coal fired and the total moisture of the coal fired is dried to 15%, the actual amount of coal consumption of the generating set is 271 t/h (15%, wet basis), which is converted into an amount of coal consumption of 345.86 t/h (total moisture is 33.4%, wet basis) before drying. In comparison with the general generating set, the actual amount of coal saved through drying the coal fired into total moisture of 15% by the drying and extraction steam generating set is as follows:

354−345.86=8.14 t/h, which is converted into a standard coal of 6.64 g/kWh.

As can be seen from the above examples, the significant energy-saving effect is great when the moisture content of the coal fired is reduced by drying in manner of indirectly heating with extraction steam.

The technical advantages of the present invention are as follows:

(1) The present invention is a new process which combines both of the conventional techniques of the coal fired steam generating set and the fluidized-bed drying system; conventional or standard equipments are used as the equipments of the present invention so that the system of the present invention is simple and has high operability.

(2) In the present invention, what is used to generate electricity in the steam turbine of the coal fired steam generating set is mechanical energy and sensible heat of the superheated steam, and what is mainly used by providing fluidized-bed dryer is latent heat which can not be used after generating electricity is performed by the steam turbine, it reduces the coal-source loss of the condensate steam generating set.

(3) In the present invention, the coal powder is dried by the fluidized-bed dryer with latent heat of the superheated steam after generating electricity is performed by the steam turbine so as to the moisture of the coal powder fed into the coal pulverizing system and the boiler is reduced, and thus the amount of the coal powder consumption is reduced due to the evaporation of the moisture in the coal powder, consequently coal is saved and consumption thereof is reduced. Since the amount of the coal powder fed into the boiler is reduced, the emission amount of the carbon dioxide is accordingly reduced.

(4) In the present invention, what is used by the fluidized-bed dryer is latent heat of the superheated steam after generating electricity is performed by the steam turbine. Therefore, the superheated steam is condensed into water and water is returned to the boiler for recirculation, which has no effect on the boiler and steam turbine system.

(5) In the fluidized-bed drying system of the present invention, the superheated steam is condensed into a condensing liquid after indirectly heat exchange and drying via the steam-piping drying; the condensing liquid is pumped into a deaerator via the condensate pump and returned to the water system of the generating set.

BRIEF DESCRIPTION OF THE DRAWINGS

FIG. 1 is a process flowchart of the present invention.
In the drawings:

| | |
|---|---|
| 1-coal powder bunker | 2-weighing belt |
| 3-coal grinding mill | 4-boilder |
| 5-steam turbine | 6-condenser |
| 7-condensate pump | 8-shaft gland heater |
| 9-first low pressure heater | 10-second low pressure heater |
| 11-third low pressure heater | 12-fourth low pressure heater |
| 13-deaerator | 14-feed water pump |
| 15-fifth high pressure heater | 16-sixth high pressure heater |
| 17-seventh high pressure heater | 18-combustion fan |
| 19-coal powder air blower | 20-air lock |
| 21-fluidized-bed dryer | 22-dust collector |
| 23-air lock | 24-heat exchanger |

-continued

| | |
|---|---|
| 25-recirculating blower | 26-condensate pot |
| 27-condensate pump | |

Wherein:
1-19 units are coal fired steam generating set
9-12 units are multi-stage low pressure heater
15-17 units are multi-stage high pressure heater
20-27 units are the fluidized-bed drying system

DETAILED DESCRIPTION OF THE PREFERRED EMBODIMENTS

In the present embodiment, a fluidized-bed drying system comprises an air lock 20, a fluidized-bed dryer 21, a dust collector 22, an air lock 23, a heat exchanger 24, a recirculating blower 25, a condensate pot 26, and a condensate pump 27. The air lock 20 and the air lock 23 are respectively provided on an upper portion and a lower portion of the fluidized-bed dryer 21. The fluidized-bed dryer 21 as used here is a horizontal multi-compartment fluidized-bed dryer with an interior heat exchange piping. The dust collector 22 is a bag dust collector. The boiler 4 of the fluidized-bed coal drying system is a coal powder boiler system of a coal pulverizing system. Hereinafter, a flowchart of a process for reducing coal consumption in a coal fired power plant with fluidized-bed drying will be further described with reference to FIG. 1.

After raw coal from a coal powder bunker 1 is weighed by a weighing belt 2, the raw coal is fed into the fluidized-bed dryer 21 via the air lock 20, coal powder is dried with superheated steam extracted from a fifth section of the steam turbine 5, the superheated steam has a pressure of 0.7 MPa. The dried coal powder is fed into a coal grinding mill 3 so as to be pulverized, and at the same time, atmosphere air is enhanced in pressure via a coal powder air blower 19, the atmosphere air is heated via preheater of the boiler 4 and then fed into the coal grinding mill 3, the pulverized coal is blown into a furnace of the boiler 4 and combusted with assistance of a combustion fan 18. The pulverized coal releases heat due to the combustion in the furnace of the boiler 4, so that water in a steam drum of the boiler 4 is evaporated into a saturated steam via heat absorption at a certain pressure, the saturated steam absorbs heat in a superheater of the boiler 4 and is changed into superheated steam, the superheated steam is expanded via the steam turbine 5 and does work for exterior so as to generate electricity. A low pressure steam (an exhaust steam) after having done work and generated electricity is fed into a condenser 6 and condensed into condensing water so as to release latent heat, the condensing water is enhanced in pressure via a condensate pump 7 and then fed into a shaft gland heater 8 and a multi-stage low pressure heater (i.e. a first lower low pressure heater 9, a second lower low pressure heater 10, a third lower low pressure heater 11 and a fourth lower low pressure heater 12) in turn and heated in stage by stage by heating medium respectively from extraction steams of a seventh section, a sixth section, a fifth section, and a fourth section of the steam turbine, and then the heated condensing water is fed into a deaerator 13 for removal of oxygen so as to be a boiler feed water. The boiler feed water is enhanced in pressure via a feed water pump 14 of the boiler 4, and fed into a multi-stage high pressure heater (i.e. a fifth high pressure heater 15, a sixth high pressure heater 16, a seventh high pressure heater 17) and reheated by heating medium respectively from extraction steams of a third section, a second section, and a first section of the steam turbine, the reheated boiler feed water is fed into a coal economizer so as to be further heated in the boiler system, and the further heated boiler feed water is fed into the steam drum for steam-liquid separation, the saturated steam is discharged from the steam drum and fed into a superheater of the boiler heater, the saturated steam is heated into superheated steam in the superheater of the boiler, the superheated steam is fed into the steam turbine for generating electricity so as to perform Rankine cycle.

The superheated steam from extraction steam of the forth section of the steam turbine is divided into two parts, i.e. one part is fed into a heat exchange piping of the fluidized-bed dryer 21 and the other part is fed into the heat exchanger 24, the heat supplied by both of the two parts are used to dry the coal powder, water vapor and noncondensable gas evaporated from the coal powder are fed into a bag dust collector 22 for removal of dust, the tail gas after removal of dust is enhanced in pressure via the recirculating blower 25 and heated by the heat exchanger 24 and then fed as a fluidized-wind and a drying wind into the fluidized-bed dryer 21 for recirculation. The dried coal powder is fed into the coal grinding mill 3, the superheated steam in the heat exchange piping of the fluidized-bed dryer 21 and the heat exchanger 24 is condensed into water, the condensed water is fed into the condensate pot 26 and enhanced in pressure via the condensate pump 27 and then is fed into the deaerator 13 for removal of oxygen.

The superheated steam from extraction steam of the forth section or the fifth section of the steam turbine is divided into two parts, i.e. one part is fed into the heat exchange piping of the fluidized-bed dryer 21 and the other part is fed into the heat exchanger 24, the heat supplied by both of the two parts are used to dry the coal powder. The superheated steam is respectively fed into the fluidized-bed dryer 21 and the heat exchanger 24 for drying the coal powder, water vapor and noncondensable gas evaporated from the coal powder are fed into the bag dust collector 21 for removal of dust, the tail gas after removal of dust is enhanced in pressure via the recirculating blower 25 and then fed into the heat exchanger 24, the heated tail gas is fed as a fluidized-wind and a drying wind into the fluidized-bed dryer 21 for recirculation. The dried coal powder is fed into the coal grinding mill 3; the superheated steam is condensed into water and is then fed into the condensate pot 26, enhanced in pressure via the condensate pump 27, fed into the deaerator 13, and mixed with condensing water which has been heated by the multi-stage low pressure heater and performed removal of oxygen together in the deaerator 13 so as to be a boiler feed water. The mixture is fed into the multi-stage high pressure heater (i.e. a fifth high pressure heater 15, a sixth high pressure heater 16, a seventh high pressure heater 17) via a feed water pump 14 and reheated by heating medium respectively from extraction steams of the third section, the second section, and the first section of the steam turbine; and the reheated mixture is fed into a coal economizer so as to be further heated in the boiler system, and the further heated boiler feed water is fed into the steam drum for steam-liquid separation, saturated steam is discharged from the steam drum and fed into an superheater of the boiler heater, the saturated steam is heated into superheated steam in the superheater of the boiler, the superheated steam is fed into the steam turbine for generating electricity so as to perform Rankine cycle.

What is claimed is:

1. A process for reducing coal consumption in a coal fired power plant with fluidized-bed drying, comprising steps of:
    weighing raw coal from a coal powder bunker of a coal fired boiler generating set by a weighing belt;
    feeding the weighed raw coal into a fluidized-bed drying system which comprises an air lock, a fluidized-bed dryer, a dust collector, an air lock, a heat exchanger, a recirculating blower, a condensate pot and a condensate pump;
    extracting superheated steam from a fourth section or a fifth section of a steam turbine and feeding the superheated steam into the fluidized-bed dryer to dry the coal powder;
    feeding water vapor and noncondensable gas evaporated from the coal powder into a dust collector for removal of dust, enhancing the tail gas after removal of dust in pressure via a recirculating blower and then feeding the tail gas into a heat exchanger, feeding the heated tail gas as a fluidized-wind and a drying wind into the fluidized-bed dryer for recirculation;
    feeding the dried coal powder into a coal grinding mill;
    condensing the superheated steam into water, feeding the condensed water into the condensate pot, enhancing the condensed water in pressure via the condensate pump, and feeding the pressurized water into a deaerator;
    mixing the pressurized water with condensing water which has been heated by a multi-stage low pressure heater so as to be a boiler feed water with performing removal of oxygen;
    sequentially feeding the boiler feed water into a fifth high pressure heater, a sixth high pressure heater, and a seventh high pressure heater via a feed water pump, reheating the boiler feed water by heating medium respectively from extraction steams of a third section, a second section, and a first section of the steam turbine; and
    feeding the reheated boiler feed water into a coal economizer so as to be further heated in the boiler system, feeding the further heated boiler feed water into a steam drum for steam-liquid separation so as to be saturated steam, discharging the saturated steam from the steam drum, and feeding the saturated steam into a superheater of the boiler and then heating the saturated steam into superheated steam in the superheater of the boiler, and feeding the superheated steam into the steam turbine for generating electricity so as to perform a Rankine cycle.

2. The process for reducing coal consumption in a coal fired power plant with fluidized-bed drying according to claim 1, wherein the drying medium used in the fluidized-bed drying system is extraction steam from the steam turbine, the extraction steam is from the first section, the second section, the third section, the fourth section, the fifth section or the sixth section of the steam turbine, and the extraction steam has a pressure of 0.6-0.8 MPa.

3. The process for reducing coal consumption in a coal fired power plant with fluidized-bed drying according to claim 1, wherein the fluidized-bed dryer in the fluidized-bed drying system is a horizontal mono-compartment fluidized-bed dryer, a horizontal multi-compartment fluidized-bed dryer, a vertical mono-layer fluidized-bed dryer, or a vertical multi-layer fluidized-bed dryer.

4. The process for reducing coal consumption in a coal fired power plant with fluidized-bed drying according to claim 1, wherein the dust collector in the fluidized-bed coal drying system is a dry dust collector or a wet dust collector.

5. The process for reducing coal consumption in a coal fired power plant with fluidized-bed drying according to claim 4, wherein the dry dust collector is a cyclone separator, a bag dust collector or an electrostatic precipitator; the wet dust collector is a Venturi wet dust collector, a swashing wet dust collector or a wet washing tower.

6. The process for reducing coal consumption in a coal fired power plant with fluidized-bed drying according to claim 1, wherein the boiler in the fluidized-bed drying system is a coal powder boiler system requiring a coal pulverizing system or a circulating fluidized-bed boiler system without pulverizing.

* * * * *